United States Patent [19]

Fukushima et al.

[11] Patent Number: 5,457,075
[45] Date of Patent: Oct. 10, 1995

[54] SINTERED CERAMIC COMPOSITE AND MOLTEN METAL CONTACT MEMBER PRODUCED THEREFROM

[75] Inventors: Hideko Fukushima, Kumagaya; Yasuo Sawano, Saitama; Katsuhiko Kojo, Fukaya, all of Japan

[73] Assignee: Hitachi Metals, Ltd., Tokyo, Japan

[21] Appl. No.: 241,331

[22] Filed: May 11, 1994

[30] Foreign Application Priority Data

May 11, 1993 [JP] Japan .................................. 5-109051
Apr. 5, 1994 [JP] Japan .................................. 6-067074

[51] Int. Cl.$^6$ .................................................. B32B 9/00
[52] U.S. Cl. .............................. 501/96; 501/97; 501/98; 75/233; 75/235; 75/238; 75/244
[58] Field of Search ............................ 501/97, 97, 98; 75/233, 235, 238, 244

[56] References Cited

U.S. PATENT DOCUMENTS 4,113,503  9/1978  Lumby et al. .................... 501/98
4,394,170  7/1983  Sawaoka et al. ................. 501/97
4,840,763  6/1989  Freitag ............................. 501/95
5,173,354  12/1992 Raj .................................. 428/432

FOREIGN PATENT DOCUMENTS 60-195059  10/1985  Japan .
4-193773   7/1992   Japan .
5-8141     2/1993   Japan .

*Primary Examiner*—Patrick J. Ryan
*Assistant Examiner*—Kam F. Lee
*Attorney, Agent, or Firm*—Antonelli, Terry, Stout & Kraus

[57] ABSTRACT

A sintered ceramic composite comprising 35 to 80 wt. % of aluminum nitride, 2 to 60 wt. % of boron nitride, 0.1 to 25 wt. % of an oxide of magnesium, 0.5 to 20 wt. % of at least one of rare earth oxides including yttrium oxide as an optional component and 25 wt. % or less of aluminum oxide as an optional component is disclosed.

11 Claims, 7 Drawing Sheets

SINTERED CERAMIC COMPOSITE AND MOLTEN METAL CONTACT MEMBER PRODUCED THEREFROM

BACKGROUND OF THE INVENTION

The present invention relates to a novel sintered ceramic composite having a good thermal shock resistance well sufficient for practical use and improved in mechanical strength after suffering from thermal shock, melting loss resistance in a molten metal and adhesion resistance to a molten metal. The present invention further relates to a molten metal contact member produced from the sintered ceramic composite, which member is utilized at a portion where a thermal shock resistance, melting loss resistance and adhesion resistance are required.

As ceramics having a good thermal shock resistance, cordierite ($MgO$—$Al_2O_3$—$SiO_2$ ceramics) and a sintered aluminum titanate, etc. have been generally known (JP-B-54-1564). These ceramics have a sufficient temperature difference for resisting a thermal shock, however, insufficient in a mechanical strength. Therefore, their use as a thermal shock resistant material has been largely restricted.

As other ceramics having a good thermal shock resistance, a sintered boron nitride, a sintered silicon nitride, a sintered sialon have been also known. However, the sintered boron nitride has a low mechanical strength and abrasion resistance, while having a good thermal shock resistance and a melting loss resistance in a molten metal. Tile sintered silicon nitride and the sintered sialon are inferior in a melting loss resistance in a molten steel while having a good thermal shock resistance, mechanical strength and abrasion resistance.

In order to compensate for the defects in each of conventional ceramics, ceramic composites comprising boron nitride and silicon nitride, or boron nitride and sialon have been reported. The ceramic composites of boron nitride and silicon nitride have been reported in JP-A-56-120575, JP-A-1-131062, JP-A-4-294846 and JP-A-5-70234. As the ceramic composites of sialon and boron nitride, JP-A-60-145963 discloses the ceramic comprising β-sialon and boron nitride, JP-A-2-255247 discloses the ceramic comprising β-sialon, electrofused alumina and boron nitride, JP-A-2-255248 discloses the ceramic comprising β-sialon, zirconia and boron nitride, and JP-A-3-153573 discloses the ceramic comprising β-sialon, boron nitride and glass phase. However, these ceramic composites have a drawback that the silicon-component contained therein, on contacting with a molten metal, especially with a molten iron, reacts selectively with iron to cause a melting loss as a result.

In order to improve the melting loss resistance of the conventional ceramics, a ceramic composite in which the melting loss resistance is improved by addition of aluminum nitride has been proposed. For example, a ceramic composites comprising boron nitride, aluminum nitride and silicon nitride is reported in JP-A-56-129666 and JP-A-60-51669. However, the improvement in the melting loss resistance is sill insufficient since the ceramics disclosed therein contain 10 wt. % or more of silicon nitride.

Recently, ceramic composites comprising boron nitride and aluminum nitride and containing no silicon nitride have been proposed. JP-A-1-246178 discloses a ceramic comprising boron nitride, aluminum nitride and $Y_2O_3$. JP-A-1-131069 discloses a ceramic comprising boron nitride and aluminum nitride. JP-A-1-261279 discloses a ceramic comprising boron nitride, aluminum nitride and a calcium compound. JP-A-1-252584, JP-A-1-261279 and JP-A-1-305862 disclose ceramics comprising boron nitride, aluminum nitride, a calcium compound and an yttrium compound. JP-A-3-252367 discloses a ceramic comprising aluminum nitride, boron nitride and $3CaO.Al_2O_3$. Further, as ceramics for use with a molten iron-based alloy, JP-A-4-332831 and JP-B-5-8141 disclose a ceramic composite comprising boron nitride, aluminum nitride and yttrium oxide.

Aluminum nitride is well known as a highly heat-conductive material, and is superior as a structural material due to its hardness of the same level as alumina, good abrasion resistance and melting loss resistance to a molten metal. However, aluminum nitride is poor in mechanical strength and thermal shock resistance. Therefore, ceramic composites in which aluminum nitride is incorporated is deteriorated in its mechanical strength, particularly in mechanical strength after suffering from a thermal shock, while being improved in melting loss resistance.

In addition, aluminum nitride can be made into a material having a good thermal shock resistance, abrasion resistance and melting loss resistance to a molten metal by incorporating boron nitride. However, the ceramic composite of boron nitride and aluminum nitride contains boron oxide inherently contained in boron nitride and a rare earth metal oxide such as yttrium oxide which is used as a sintering aid. When such a ceramic composite is immersed into a molten metal in a long time period, a complex oxide derived from the molten metal and an oxide thereof leads to the wetting of the ceramics with the molten metal thereby causing a corrosion by the molten metal. Then, the ceramics finally suffer from a melting loss or an undesirable adhesion of the metal on the ceramic surface which may result in rupture of the ceramics upon peeling of the adhered metal. Therefore, for the ceramics usable as a molten metal member for a molten metal, it is insufficient to merely have a good melting loss resistance and it is necessary to have a good adhesion resistance to a molten metal. A ceramic having a sufficient adhesion resistance can be effectively used as a member, especially, as a member which is immersed into a molten metal because a small amount of or no adhesion of the metal can avoid the melting loss. In the present invention, the term of the adhesion resistance to a molten metal means that no metal adheres on the ceramic surface after a ceramic is immersed in a molten metal or means that a slight amount of metal adheres on the ceramic surface while the adhered metal can be easily removed from the surface without causing any rupture of the ceramic. In the case that a ceramic is highly adhesive to a molten metal or the adhered metal is hardly removed from the ceramic surface, the ceramic suffer from the melting loss or rupture. This results in a problem that the molten metal is deteriorated in its characteristics by the contamination due to ceramic fragments and the repeated use of the ceramic is made difficult.

Therefore, a ceramic which is superior in the melting loss resistance and the thermal shock resistance, especially, in the bending strength after thermal shock has been strongly desired to be developed. In addition, a ceramic which is superior not only in the thermal shock resistance and the melting loss resistance but also in the adhesion resistance to a molten metal has been also desired to be developed.

OBJECT AND SUMMARY OF THE INVENTION

Accordingly, an object of the present invention is to provide a sintered ceramic composite having a good melting loss resistance and a good thermal shock resistance, especially, a high bending strength after suffering from a thermal shock.

Another object of the present invention is to provide a sintered ceramic composite having a good melting loss resistance in a molten metal and a good adhesion resistance to a molten metal in addition to a thermal shock resistance sufficient for practical use Further object of the present invention is to provide a molten metal contact member for use in contact with a molten iron-based alloy.

In order to accomplish the above objects, the present inventors have made insistent and continuous studies on ceramic composites composed of aluminum nitride and boron nitride as the primary component, and have found that a sintered ceramic composite comprising aluminum nitride, boron nitride and an oxide of magnesium in a specified composition shows a good thermal shock resistance, with no crack and no fracture even after the use in an molten metal, well sufficient for practical use as well as has a good melting loss resistance to a molten metal and a good adhesion resistance in a molten metal.

The present inventors have further found that a sintered ceramic composite comprising aluminum nitride, boron nitride, magnesium oxide and at least one rare earth oxide including yttrium oxide in a specified composition has a remarkably improved bending strength, even after suffering from a thermal shock, in addition to a good melting loss resistance and thermal shock resistance.

Therefore, in the first aspect of the present invention, there is provided a sintered ceramic composite comprising 35 to 80 wt. % of aluminum nitride, 2 to 60 wt. % of boron nitride, 0.1 to 25 wt. % of an oxide of magnesium, 0.5 to 20 wt. % of at least one rare earth oxide including yttrium oxide as an optional component and 25 wt. % or less of aluminum oxide as an optional component.

In the second aspect of the present invention, there is provided a sintered ceramic composite containing aluminum nitiride, hexagonal boron nitride and magnesium aluminum oxide ($MgAl_2O_4$) as identified by X-ray diffraction.

In the third aspect of the present invention, there is provided a sintered ceramic composite containing a rare earth oxide including yttrium oxide and/or a complex oxide of aluminum oxide and the rare earth oxide including yttrium oxide as identified by X-ray diffraction.

In the fourth aspect of the present invention, there is provided a sintered ceramic composite having an intensity ratio from 0.05 to 0.5, the ratio being defined as the ratio of the intense of the strongest X-ray diffraction peak due to $MgAl_2O_4$ to the intense of the strongest X-ray diffraction peak due to hexagonal boron nitride.

In the fifth aspect of the present invention, there is provided a sintered ceramic composite comprising aluminum, boron, nitrogen, magnesium and oxygen in which $MgAl_2O_4$ and hexagonal boron nitride as identified by X-ray diffraction are present in a grain boundary formed between aluminum nitride particles.

In the sixth aspect of the present invention, there is provided a molten metal contact member for use in contact with a molten iron-based alloy made from the sintered ceramic composite as defined above.

DETAILED DESCRIPTION OF THE INVENTION

Figure 1A:
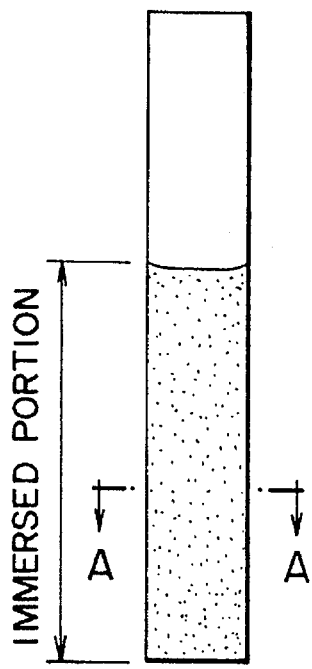
FIG. 1(a) is an external view of a sintered ceramic composite of the present invention after immersion test.

The present invention will be described in detail below.

The content of aluminum nitride (AlN) in the sintered ceramic composite, which is used for providing it with an abrasion resistance and melting loss resistance, is from 35 to 80 wt. %. The content less than 35 wt. % results in an insufficient abrasion resistance and melting loss resistance, while the content exceeding 80 wt. % providing a final ceramic with an insufficient thermal shock resistance. The content from 40 to 60 wt. % is preferred since the abrasion resistance is better when the content is 40 wt. % or more while the thermal shock resistance is better when the content is 60 wt. % or less.

The content of boron nitride (BN) in the sintered ceramic composite, which is added for the purpose of improvement of the thermal shock resistance, is from 2 to 60 wt. %. When the content is lower than 2 wt. %, a sufficient thermal shock resistance can not be attained. When the content is higher than 60 wt. %, the melting loss resistance is deteriorated since boron nitride become wettable with a molten metal. A higher content of boron nitride may affect the abrasion resistance and mechanical strength, in particular, the bending strength after a thermal shock. Therefore, in considering the improvement of the bending strength after a thermal shock, the content of boron nitride is preferred to be in the range from 2 to 45 wt. %. Further, from the view point of the thermal shock resistance, the content of boron nitride is preferred to be higher. Therefore, the content is preferred to be from 10 to 60 wt. % and more preferred to be from 20 to 60 wt. % when the improvement of the thermal shock resistance is intended, while 10 to 40 wt. % being preferred when a higher abrasion resistance and strength is required. Thus, the most preferred content, as a whole, of boron nitride is from 20 to 40 wt. %. In addition, even in the presence of a slight amount of boron oxide in boron nitride, the adhesion resistance of a sintered ceramic in which $MgAl_2O_4$ is present is superior as compared with that of a sintered ceramic with no $MgAl_2O_4$.

The boron nitride may be incorporated in the starting powder mixture for producing the ceramic composite or may be produced from boron carbide, which is incorporated into the starting powder mixture in place of boron nitride, during the sintering stage under nitrogen atmosphere.

The oxide of magnesium, which may include magnesium oxide (MgO), $MgAl_2O_4$, etc., is used for imparting the adhesion resistance to a molten metal and thermal shock resistance, and used for densifying the final product. The content of the oxide of magnesium is from 0.1 to 25 wt. %, while the content lower than 0.1 wt. % has no effect in improving the melting loss resistance and adhesion resistance and no effect in densification, and the content higher than 25 wt. % causes deterioration of the thermal shock resistance. Although, the preferred range of the content of the oxide of magnesium varies according to the required properties, the range from 0.5 to 25 wt. % is preferred for the improvement in the bending strength after a thermal shock, while the range from 1 to 10 wt. % being more preferred as a whole.

The adhesion resistance of the sintered ceramic composite of the present invention may be presumed to be imparted due to $MgAl_2O_4$ present therein. When magnesium oxide (MgO) is used in the starting powder mixture as the oxide of magnesium, $MgAl_2O_4$ is formed by the reaction of magnesium oxide and $Al_2O_3$ during the sintering stage. The presence of the oxide of magnesium in the sintered ceramic composite contributes to oxidation resistance thereof. This is presumed due to the decrease in the mobility of oxygen present in the grain boundary phase caused by the interaction between a complex oxide in the grain boundary and the oxide of magnesium.

The content of the rare earth oxide including yttrium oxide which may be optionally used is from 0.5 to 20 wt. %. One or more kinds of the oxides may be used in a proportion from 0.5 to 20 wt. %. The rare earth oxide including yttrium oxide acts as a sintering aid and contributes to densification of a final product sintered without the application of pressure. When the content is less than 0.5 wt. %, it is difficult to obtain a densified product by a sintering operation without the application of pressure. When the content is higher than 20 wt. %, the thermal shock resistance is deteriorated and the sintered product becomes wettable with a molten metal, this resulting in a deterioration in the adhesion resistance. The use of the oxide in 5 wt. % or higher makes the densification in a pressureless sintering more easy, however, the addition amount is preferred to be 15 wt. % or less in considering the deterioration in the adhesion resistance. As the rare earth oxide including yttrium oxide, dysprosium oxide is preferred in respect of the sintering properties and the adhesion resistance. In addition, even in the presence of one or more of the rare earth oxide including yttrium oxide, the adhesion resistance of a sintered ceramic in which $MgAl_2O_4$ is present is superior as compared with that of a sintered ceramic with no $MgAl_2O_4$.

The sintered ceramic composite of the present invention may be further contain aluminum oxide ($Al_2O_3$) as an optional component in an proportion of 25 wt. % or less. The added aluminum oxide react with magnesium oxide in the sintering stage to produce $MgAl_2O_4$ and acts as a sintering aid. The use of aluminum oxide in an amount exceeding 25 wt. % is disadvantageous because of lowering in the thermal shock resistance. The thermal shock resistance would become more favorable when the content of aluminum oxide is 10 wt. % or below. Aluminum oxide may be also derived from aluminum nitride by the action of the inherent oxygen contained in the starting powder of aluminum nitride. The aluminum oxide derived from the reaction between aluminum nitride and oxygen shows a similar action to that of the aluminum oxide added to the starting powder mixture, i.e., production of $MgAl_2O_4$ and operation as a sintering aid.

The sintered ceramic composite of the present invention may be produced by a conventionally known method. Each powder of aluminum nitride, boron nitride, the oxide of magnesium, at least one rare earth oxide including yttrium oxide as an optional component, and an optional aluminum oxide are mixed together in the proportions within the ranges described above in a ball mill using ethanol as the disperse medium. The mean particle size of the starting materials is not specifically restricted, however, generally preferred in the range from 0.2 to 5 µm for aluminum nitride, from 0.2 to 10 µm for boron nitride, from 0.2 to 10 µm for the oxide of magnesium, from 0.2 to 5 µm for the rare earth oxide including yttrium oxide, from 0.2 to 5 µm for aluminum oxide. The resultant slurry was subjected to granulation by the use of a spray drier to form granulate having a mean particle size from 50 to 150 µm. The granulate is cold isostatically pressed or uniaxially pressed in a metal die at a pressure generally in the range from 300 to 5000 kg/cm². The resultant preform is then sintered at 1600 to 2000° C. for 0.5 to 10 hours in nitrogen or argon atmosphere to produce the sintered ceramic composite. As the sintering method, either of the pressureless sintering or pressure sintering (hot press, hot isostatic press, etc.) may be employed. In the case of sintering with the application of pressure, the applied pressure is preferred in the range from 100 to 2000 kg/cm².

The excellent adhesion resistance and melting loss resistance of the sintered ceramic composite of the present invention seems due to the presence of $MgAl_2O_4$ and aluminum nitride, while the excellent thermal shock resistance seems due to the presence of hexagonal boron nitride.

The sintered ceramic composite of the present invention having the following composition:

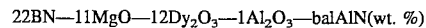

$$22BN—11MgO—12Dy_2O_3—1Al_2O_3—balAlN(wt. \%)$$

wherein BN is boron nitride, AlN is aluminum nitride, bal is balance, and the numerical values are the weight-based content, was examined by X-ray diffraction and EPMA (X-ray microanalyzer). The identification analysis by X-ray showed the presence of $MgAl_2O_4$, hexagonal boron nitride, aluminum nitride and $AlDy_3$. The line analysis by EPMA showed the presence of boron nitride particles and oxide of magnesium in the grain boundary of aluminum nitride particles in the location between the aluminum nitride cohesive particles. Therefore, the present sintered ceramic composite is presumed to have a structure in which the grain boundary phase of complex oxides consisting of $Al_2O_3$, $Dy_2O_3$, etc. is formed in the grain boundary between the alumunum nitride particles, and hexagonal boron nitride and $MgAl_2O_4$ are interpositioned in the grain boundary phase. When the rare earth oxide or aluminum oxide is not used, the grain boundary is presumed to be formed with complex oxide consisting of oxides of magnesium, boron oxide, etc.

The intensity ratio of the intense of the strongest X-ray diffraction peak due to $MgAl_2O_4$ to the intense of the strongest X-ray diffraction peak due to hexagonal boron nitride is 0.05 to 0.5. The sintered ceramic composite having an intensity ratio within the above range shows an excellent adhesion resistance and thermal shock resistance. In the case that the intensity ratio is less than 0.05, the sintered ceramic composite becomes easy to adhere to a molten metal, thereby causing the lowering of the releasability from the solidified metal, while the thermal shock resistance being deteriorated in the case that the intensity ratio is higher than 0.5. When the thermal shock resistance is important, the intensity ratio is preferred to be 0.3 or less.

The sintered ceramic composite as described above and as specified above is excellent in the thermal shock resistance. In particular, the sintered ceramic composite comprising 35 to 80 wt. % of aluminum nitride, 2 to 45 wt. % of boron nitride, 0.5 to 25 wt. % of magnesium oxide and 0.5 to 20 wt. % of at least one rare earth oxide including yttrium oxide shows an excellent mechanical strength even after suffering from a thermal shock. More in detail, such a sintered ceramic composite has a bending strength of 15 MPa or higher even after suffering from a thermal shock of 1000° C. temperature difference. The sintered ceramic composite having such properties are preferably applicable as a molten metal member used in a portion suffering from a thermal shock.

The present sintered ceramic composite is further excellent in the melting loss resistance and the adhesion resistance, especially, these properties are significantly improved in those comprising 35 to 80 wt. % of aluminum nitride, 10 to 60 wt. % of boron nitride, 0.1 to 25 wt. % of an oxide of magnesium, an optional component of 0.5 to 20 wt. % of at least one rare earth oxide including yttrium oxide and another optional component of 25 wt. % or less of aluminum oxide. Such a sintered ceramic composite is applicable as a molten metal contact member for a molten metal having the melting point of 1000° C. or higher. The molten metal contact member may include a protective tube for temperature measurement, a break ring, an immersion nozzle, etc. The sintered ceramic composite of the present invention is excellent in the adhesion resistance, in particular, to a molten iron-based alloy. Therefore, the application to a molten metal contact member for a molten iron-based alloy is most preferred, however, it may be preferably applied to a molten metal such as nickel-based alloy, cobalt-based alloy, etc.

The present invention will be described in further detail by ways of the following Examples without intention of restricting the scope of the present invention.

Examples 1 to 38 and Comparative Examples 1 to 4

The required amounts of powder of aluminum nitride, boron nitride, magnesium oxide, the rare earth oxide including yttrium oxide were mixed in a ball mill using ethanol as the disperse medium. The resultant powder mixture was compacted to a form, and then sintered for holding at 1800° C. for 1 hour in nitrogen atmosphere. The compositions of the sintered products are shown in Table 1.

The sintered products were subjected to the bending test after each test piece was heated to 1000° C. and quenched by dropping into a 0° C. water. The bending strength was measured by 4 point bending test according to the method of JIS R 1601. For the purpose of comparison, several sintered products which had compositions out of the range specified in the present invention, were produced and the bending strength thereof was evaluated in the same manner as above. The results are also shown in Table 1.

From Table 1, it will be seen that the sintered ceramic composite of the present invention still has a bending strength of 15 MPa or above even after suffering from a thermal shock of 1000° C. It will also be seen that dysprosium oxide, of the oxides of rare earth elements, provide the sintered product with a extremely high thermal shock resistance.

TABLE 1

| Example No. | AlN wt. % | BN wt. % | MgO wt. % | Rare Earth Oxide | wt. % | Density of Sintered Product g/cm$^3$ | Thermal Shock Resistance MPa |
|---|---|---|---|---|---|---|---|
| 1 | 71 | 6 | 2 | $Y_2O_3$ | 20 | 3.33 | 36 |
| 2 | 78 | 3 | 6 | $Y_2O_3$ | 13 | 3.23 | 29 |
| 3 | 64 | 18 | 12 | $Y_2O_3$ | 6 | 2.70 | 40 |
| 4 | 45 | 30 | 12 | $Y_2O_3$ | 13 | 1.98 | 23 |
| 5 | 35 | 29 | 23 | $Y_2O_3$ | 13 | 1.57 | 21 |
| 6 | 76 | 6 | 5 | $Ce_2O_3$ | 13 | 3.44 | 41 |
| 7 | 62 | 14 | 11 | $Ce_2O_3$ | 13 | 2.93 | 43 |
| 8 | 44 | 21 | 22 | $Ce_2O_3$ | 13 | 2.36 | 23 |
| 9 | 71 | 12 | 5 | $Ce_2O_3$ | 12 | 3.14 | 35 |
| 10 | 75 | 12 | 5 | $Ce_2O_3$ | 8 | 3.14 | 28 |
| 11 | 59 | 18 | 12 | $Ce_2O_3$ | 11 | 2.80 | 35 |
| 12 | 73 | 13 | 8 | $Eu_2O_3$ | 6 | 3.25 | 32 |
| 13 | 58 | 18 | 11 | $Eu_2O_3$ | 13 | 2.90 | 35 |
| 14 | 54 | 22 | 11 | $Eu_2O_3$ | 13 | 2.50 | 25 |
| 15 | 75 | 13 | 10 | $Pr_2O_3$ | 12 | 2.98 | 30 |
| 16 | 62 | 16 | 12 | $Pr_2O_3$ | 10 | 2.83 | 28 |
| 17 | 52 | 14 | 22 | $Pr_2O_3$ | 12 | 2.77 | 32 |
| 18 | 72 | 7 | 11 | $Eu_2O_3$ | 10 | 2.88 | 39 |
| 19 | 45 | 21 | 22 | $Eu_2O_3$ | 12 | 2.44 | 25 |
| 20 | 71 | 6 | 2 | $Dy_2O_3$ | 21 | 3.43 | 50 |
| 21 | 72 | 6 | 1 | $Dy_2O_3$ | 21 | 3.43 | 51 |
| 22 | 77 | 6 | 5 | $Dy_2O_3$ | 12 | 3.34 | 56 |
| 23 | 72 | 12 | 5 | $Dy_2O_3$ | 11 | 3.04 | 50 |
| 24 | 79 | 3 | 6 | $Dy_2O_3$ | 12 | 3.43 | 44 |
| 25 | 74 | 13 | 8 | $Dy_2O_3$ | 5 | 3.05 | 47 |
| 26 | 76 | 13 | 10 | $Dy_2O_3$ | 1 | 2.68 | 45 |
| 27 | 76 | 12 | 5 | $Dy_2O_3$ | 7 | 3.04 | 43 |
| 28 | 65 | 18 | 12 | $Dy_2O_3$ | 5 | 2.80 | 45 |
| 29 | 71 | 7 | 11 | $Dy_2O_3$ | 11 | 2.78 | 54 |
| 30 | 63 | 14 | 11 | $Dy_2O_3$ | 12 | 2.83 | 58 |
| 31 | 59 | 18 | 11 | $Dy_2O_3$ | 12 | 2.70 | 50 |
| 32 | 55 | 22 | 11 | $Dy_2O_3$ | 12 | 2.20 | 50 |
| 33 | 46 | 30 | 12 | $Dy_2O_3$ | 12 | 2.08 | 38 |
| 34 | 53 | 14 | 22 | $Dy_2O_3$ | 11 | 2.57 | 47 |
| 35 | 45 | 21 | 22 | $Dy_2O_3$ | 12 | 2.06 | 38 |
| 36 | 36 | 29 | 23 | $Dy_2O_3$ | 12 | 1.77 | 36 |
| 37 | 30 | 38 | 20 | $Dy_2O_3$ | 12 | 1.70 | 30 |
| 38 | 36 | 43 | 10 | $Dy_2O_3$ | 11 | 1.75 | 27 |
| 1* | 45 | 50 | 0 | $Y_2O_3$ | 5 | 1.90 | 13 |
| 2* | 30 | 62 | 0 | $Y_2O_3$ | 8 | 1.65 | 10 |
| 3* | 31 | 55 | 0 | $Dy_2O_3$ | 14 | 1.65 | 10 |
| 4* | 20 | 65 | 0 | $Dy_2O_3$ | 15 | 1.48 | 8 |

Note: 1* to 4* are Comparative Examples 1 to 4.

Examples 39 to 42 and Comparative Example 5

The sintered ceramic composites having the compositions shown in Table 2 were produced in accordance with the same manner as in Example 1. The oxidation resistance and the molten iron resistance were measured on the sintered products.

The sintered products were subjected to heat treatment under the condition of 1400° C.×20 hours in the atmosphere. Then, the increased amount was measured, and the oxidation resistance was evaluated by the ratio of the increased amount to the surface area of the test piece (mg/cm$^2$).

The molten iron resistance was evaluated as follows. A peace of SS41 steel (5×5×5 mm) was mounted on the surface of the sintered product, then subjected to heat treatment in vacuum at 1500° C. for one hour. After the treatment, the breadth and the height of the SS41 steel spread out were measured, and the molten iron resistance was represented by the quotient of height/breadth. A larger value of the quotient indicates a low wettability of the sintered product by the molten iron and a high molten iron resistance.

The results are shown in Table 2. It will be seen from Table 2 that the sintered ceramic composite of the present invention is also excellent in the oxidation resistance and the molten iron resistance.

TABLE 2

| Example No. | AlN wt. % | BN wt. % | MgO wt. % | Rare Earth Oxide | wt. % | Oxidation Resistance mg/cm$^2$ | Molten Iron Resistance |
|---|---|---|---|---|---|---|---|
| 39 | 71 | 8 | 10 | Dy$_2$O$_3$ | 11 | 16 | 0.55 |
| 40 | 63 | 14 | 11 | Dy$_2$O$_3$ | 12 | 13 | 0.52 |
| 41 | 59 | 18 | 15 | Y$_2$O$_3$ | 8 | 19 | 0.43 |
| 42 | 55 | 26 | 7 | Y$_2$O$_3$ | 12 | 25 | 0.30 |
| 5* | 45 | 45 | 0 | Y$_2$O$_3$ | 10 | 41 | 0.10 |

Note: 5* is Comparative Example 5.

Examples 43 to 46 and Comparative Examples 6 to 8

Each powder mixture was formed by mixing the required amount of aluminum nitride of 0.2 to 5 µm, boron nitride of 0.2 to 10 µm, magnesium oxide of 0.2 to 10 µm, aluminum oxide of 0.2 to 5 µm and the rare earth oxide including yttrium oxide of 0.2 to 5 µm. The powder mixture was further mixed in a ball mill using ethanol as the disperse medium, granulated by a spray drier, and then compacted into a preform in an uniaxial press at 1 ton/cm$^2$. The preform was subjected to a pressureless sintering at 1800° C. for 3 hours in a nitrogen atmosphere to obtain a sintered ceramic composite having a size of 15 mm width, 100 mm long and 5 mm thickness.

The obtained sintered products were evaluated on the thermal shock resistance, melting loss resistance, adhesion resistance to a molten metal. The results of the evaluation and the composition of the starting powder mixtures are shown in Table 3.

In the thermal shock resistance, each sintered product was immersed without preheating into a molten SKH51 steel of 1520° C. in a high-frequency melting furnace. The sintered product was taken out from the molten metal after 10-minute immersion and the presence of cracks and fractures was observed. The sintered product free from cracks and fractures is excellent in the thermal shock resistance and is shown in Table 3 by the reference "good".

The test piece with no cracks and fractures in the thermal shock resistance test was further subjected to the evaluation of the melting loss resistance and the adhesion resistance to a molten metal. The test piece was immersed into a molten SKH51 steel held at 1520° C. in a high-frequency melting furnace. The immersed test piece was taken out from the molten metal after 60-minute immersion, and the amount of the metal and slag adhered on the test piece was measured. The adhesion resistance was evaluated by the adhesion amount per unit area of the immersed portion (mg/cm$^2$). The melting loss was evaluated by the ratio of the decreased volume after immersion to the volume before immersion in the immersed portion. In Examples 43 to 46 and Comparative Example 6, the adhesion resistance test was carried on also in a molten copper in the same procedure as in the molten SKH51 steel.

In table 1, the lower figures mean an excellent melting loss resistance and adhesion resistance.

The external views of the test pieces after the adhesion resistance to molten SKH51 in Examples 43 to 45 and Comparative Example 8 are shown in FIGS. 1(a), 1(b), 1(c) and 1(d), respectively.

Figure 2A:
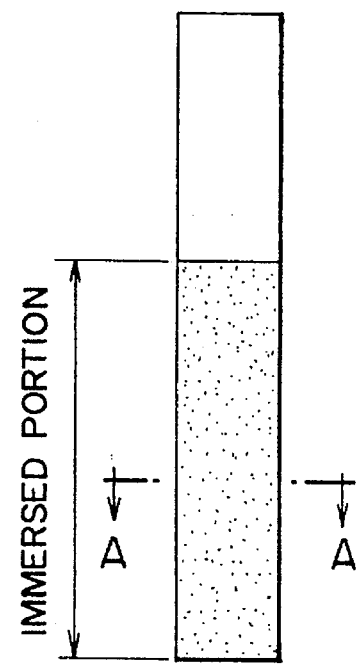
FIG. 2(a) is an external view of another sintered ceramic composite of the present invention after immersion test.
Figure 1B:
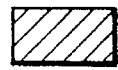
FIG. 1(b) is a cross-sectional view taken along the line A—A in FIG. 1(a)
Figure 2B:
FIG. 2(b) is a cross-sectional view taken along the line A—A in FIG. 2(a)
Figure 3A:
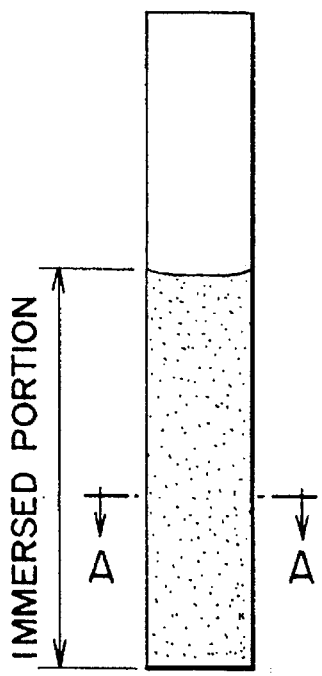
FIG. 3(a) is an external view of still another sintered ceramic composite of the present invention after immersion test.
Figure 4A:
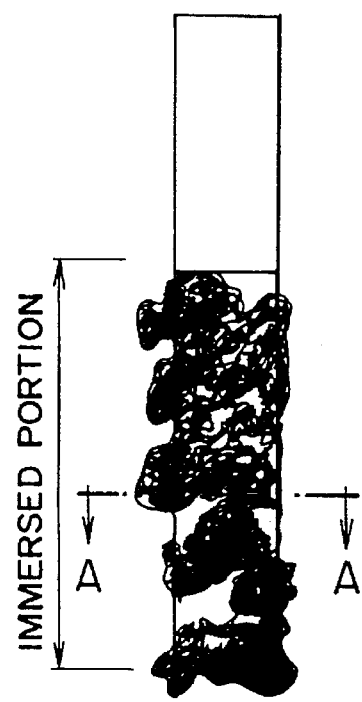
FIG. 4(a) is an external view of a conventional ceramic after immersion test.
Figure 3B:
FIG. 3(b) is a cross-sectional view taken along the line A—A in FIG. 3(a)
Figure 4B:
FIG. 4(b) is a cross-sectional view taken along the line A—A in FIG. 4(a)
Figure 5:
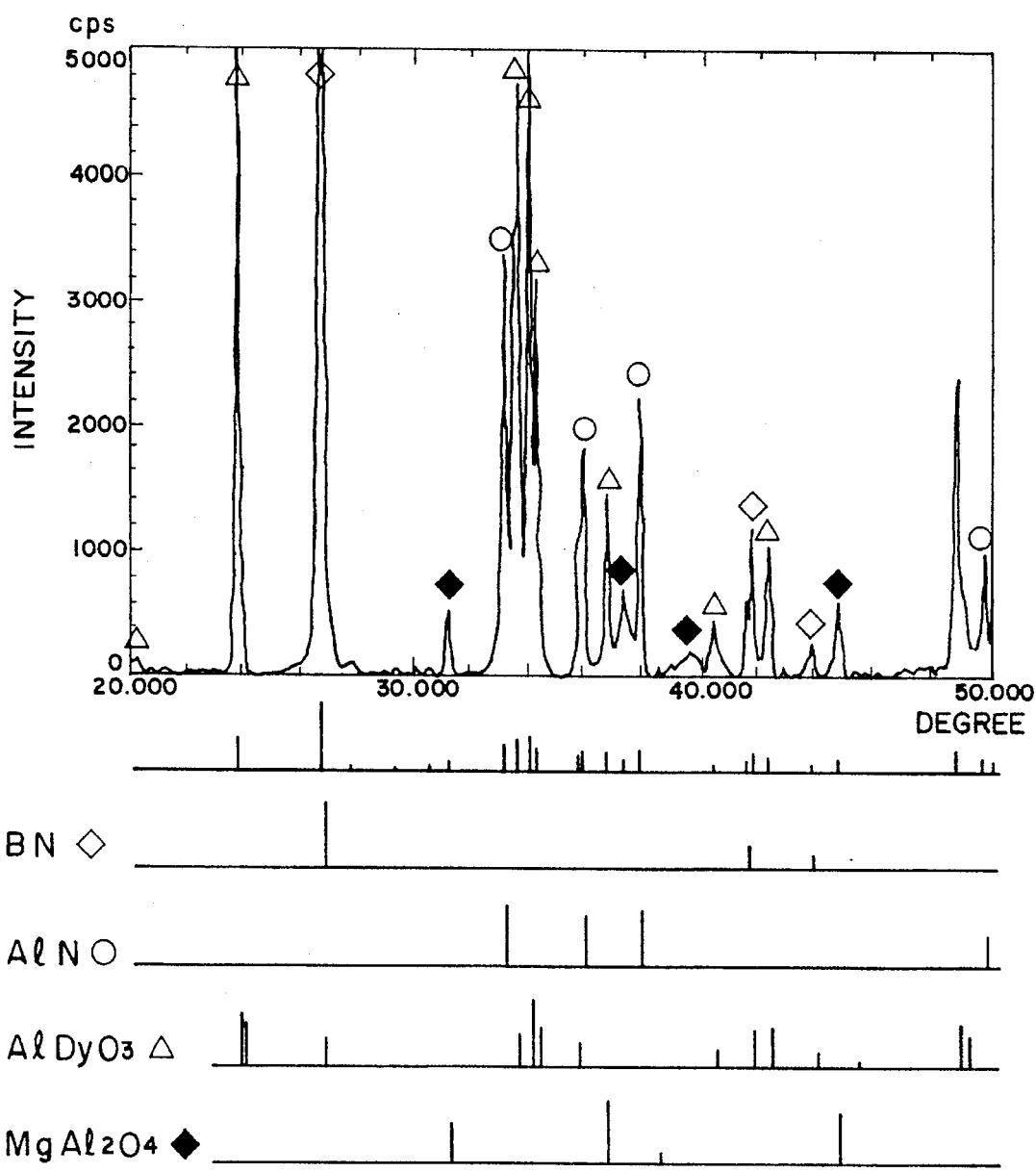
FIG. 5 is X-ray diffraction data of the sintered ceramic composite of the present invention.
Figure 6:
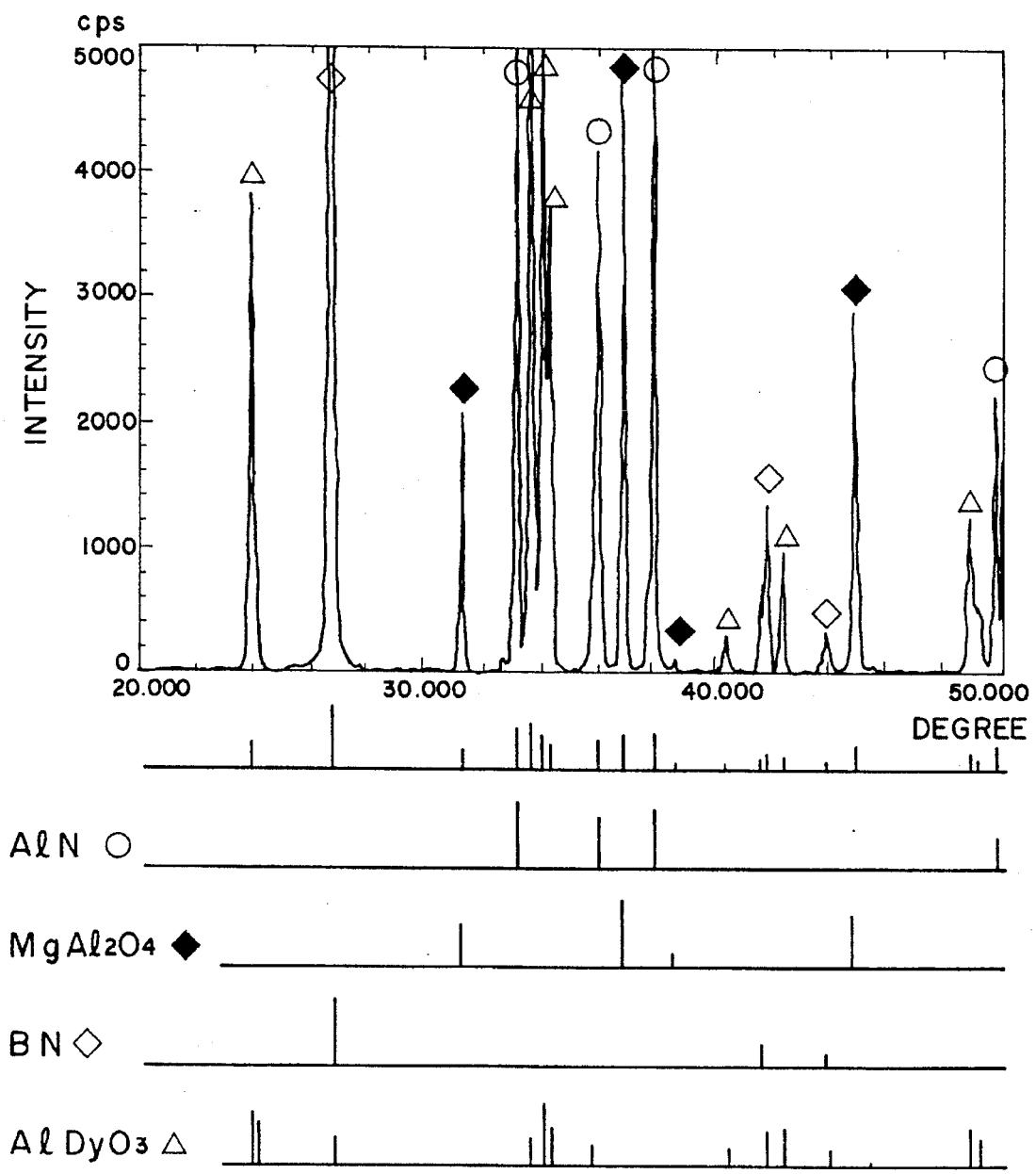
FIG. 6 is another X-ray diffraction data of the sintered ceramic composite of the present invention.
Figure 7:
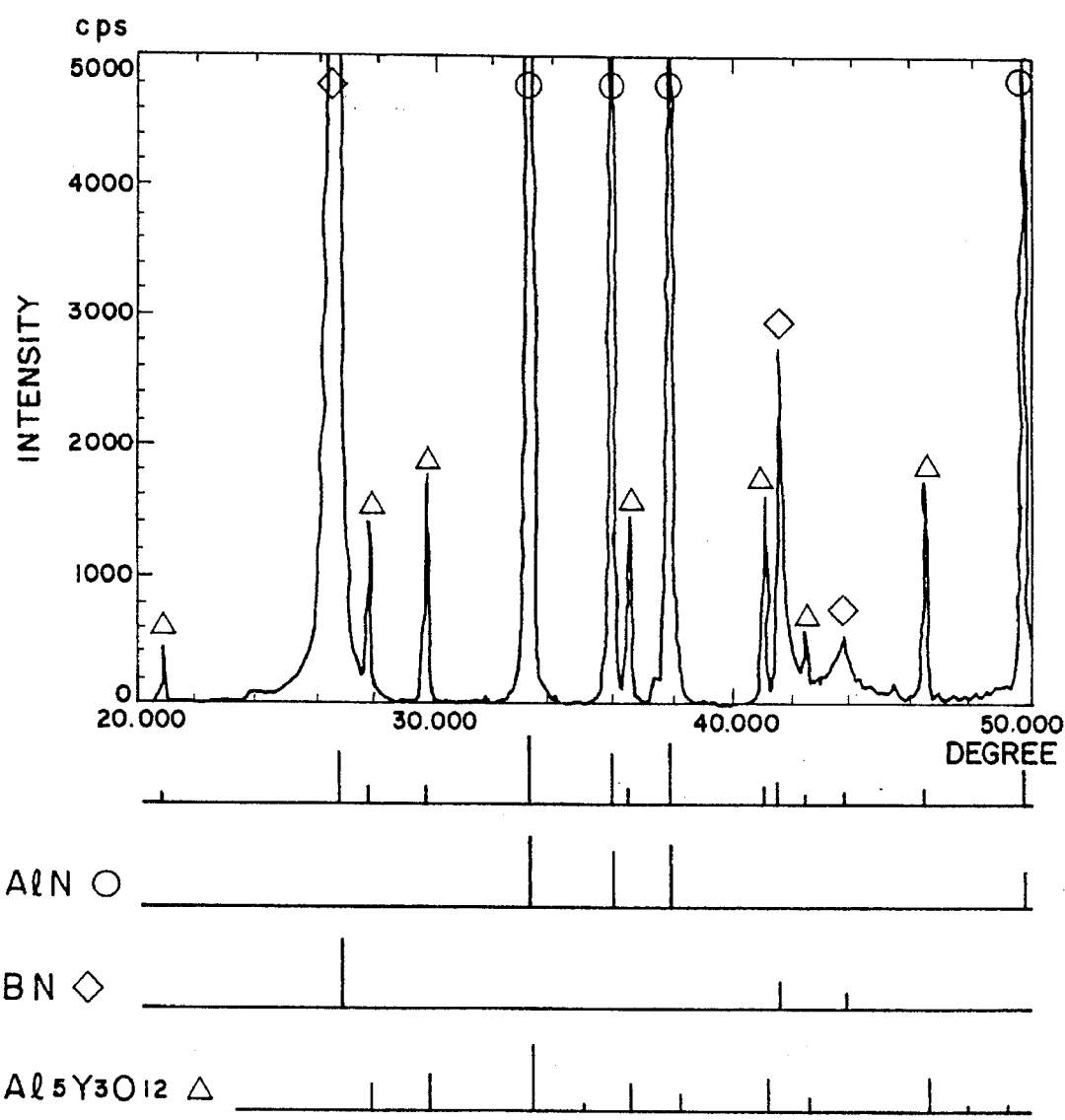
FIG. 7 is X-ray diffraction data of a sintered ceramic composite containing no $MgAl_2O_4$.

The X-ray diffraction patterns of Examples 44 and 45 and Comparative Example 6 are shown in FIGS. 2 to 4. The intensity ratios of the strongest X-ray diffraction peak due to MgAl$_2$O$_4$ to the strongest X-ray diffraction peak due to hexagonal boron nitride, calculated from the X-ray diffraction patterns in FIGS. 2 to 4, were 0.3 for FIG. 2 (Example 44), 0.5 for FIG. 3 (Example 45) and 0 for FIG. 4 (Comparative Example 6). The diffraction peak of 112-face was used as the strongest X-ray diffraction peak due to hexagonal boron nitride, and the diffraction peak of 311-face for MgAl$_2$O$_4$.

It will be seen from Table 3 that the thermal shock resistance is good in Examples 43 to 46 and Comparative Examples 6 to 8, however, the figures of the melting loss and the adhesion amount are larger in Comparative Examples. Examples of the present invention show a small adhesion amount and 0 for the melting loss, indicating an excellent melting loss resistance and adhesion resistance to a molten metal.

From FIGS. 2 to 4, it will be seen that the sintered ceramic composite of the present invention (FIGS. 2 and 3) contains aluminum nitride, hexagonal boron nitride and MgAl$_2$O$_4$, however, the conventional sintered product does not contain MgAl$_2$O$_4$. Therefore, an excellent adhesion resistance of the present invention is presumed to be attributed to the generation of MgAl$_2$O$_4$ in the sintered product. In any way, the MgAl$_2$O$_4$ generated from the impurity Mg would be difficult to be detected in X-ray diffraction.

TABLE 3

| | Composition (wt. %) | | | | | | In Molten Fe | | | In Molten Cu |
|---|---|---|---|---|---|---|---|---|---|---|
| Example No. | AlN | BN | MgO | Rare Earth Oxide | | Al$_2$O$_3$ | Thermal Shock Resistance | Melting Loss (vol. %) | Adhesion Amount (mg/cm$^2$) | Adhesion Amount (mg/cm$^2$) |
| 43 | 55 | 35 | 10 | — | 0 | 0 | good | 0 | 3 | 2 |
| 44 | 44 | 22 | 22 | Dy$_2$O$_3$ | 12 | 0 | good | 0 | 3 | 3 |
| 45 | 41 | 21 | 11 | Dy$_2$O$_3$ | 12 | 15 | good | 0 | 2 | 2 |
| 46 | 59 | 31 | 2.5 | Dy$_2$O$_3$ | 7.5 | 0 | good | 0 | 1 | 0 |
| 6* | 10 | 90 | 0 | — | 0 | 0 | good | 25 | 15 | 20 |
| 7* | 25 | 74 | 0 | CaO | 1 | 0 | good | 13 | 45 | — |
| 8* | 27 | 70 | 0 | Y$_2$O$_3$ | 3 | 0 | good | 11 | 67 | — |

Note: 6* to 8* are Comparative Examples 6 to 8.

Examples 47 to 50 and Comparative Examples 9 and 10

From each of the powder mixtures having the compositions as shown in Table 4, the sintered ceramic composite was produced in the same manner as in Example 43. The obtained sintered products were further examined on the relationship between the intensity ratio of X-ray diffraction and the adhesion resistance and thermal shock resistance. The results are shown in Table 4.

The adhesion resistance to a molten iron was evaluated in the same manner as in Example 43. The thermal shock resistance was evaluated as the bending strength after the sintered products suffered from a thermal shock since any of the test pieces were free from cracks and fractures after being subjected to the same test as in Example 43. The bending test was carried out by heating the test piece at 1000° C., dropping the heated test piece into a 0° C. water to quench it, and then measuring the bending strength of the test piece by 4 point bending test according to JIS R 1601.

It will be seen from Table 4 that the adhesion resistance is poor when the intensity ratio of X-ray diffraction is 0.03, and that the thermal shock resistance begins to be deteriorated as the intensity ratio exceeds 0.5, and the thermal shock resistance becomes more excellent when the intensity ratio is 0.3 or lower.

melting loss resistance and adhesion resistance to a molten iron in the same manner as in Example 43. As to the sintered products listed in Table 5 to 7, the thermal shock resistance was measured in the same manner as in Example 43. As to the sintered products listed in Table 8, the thermal shock resistance was evaluated by the bending strength after a thermal shock in the same manner as in Example 47.

Table 5 is intended to show the dependency of the properties on the addition amount of aluminum nitride, the dependency on the addition amount of boron nitride in Table 6, the dependency on the addition amount of magnesium oxide or $MgAl_2O_4$, and the dependency on the addition amount of aluminum oxide. The mean particle sizes of the starting materials used were the same as in Example 43. In Examples 62 and 63, $MgO.Al_2O_3$ ($MgAl_2O_4$) was used in stead of magnesium oxide.

From Table 5, it will be seen that the adhesion resistance and the melting loss resistance become poor without using aluminum nitride, and the cracks and fractures are present when the content of aluminum oxide is 90 wt. %, thus the sufficient thermal shock resistance cannot be attained.

From Table 6, it will be seen that the adhesion resistance and the melting loss resistance are not provided when the boron nitride content is as large as 68 wt. %.

From Table 7, it will be seen that the adhesion resistance is not obtained without using magnesium oxide, whereas,

TABLE 4

| Example No. | Composition (wt. %) | | | | | Intensity Ratio $MgAl_2O_4/BN$ | Thermal Shock Resistance (MPa) | Adhesion Amount (mg/cm$^2$) |
| --- | --- | --- | --- | --- | --- | --- | --- | --- |
| | AlN | BN | MgO | Rare Earth Oxide | $Al_2O_3$ | | | |
| 47 | 58 | 31 | 3 | $Dy_2O_3$ 7 | 1 | 0.06 | 42 | 3 |
| 48 | 51 | 30 | 7 | $Dy_2O_3$ 11 | 1 | 0.15 | 38 | 2 |
| 49 | 46 | 30 | 12 | $Dy_2O_3$ 11 | 1 | 0.28 | 33 | 1 |
| 50 | 69 | 30 | 20 | $Dy_2O_3$ 10 | 1 | 0.45 | 31 | 1 |
| 9* | 57 | 35 | 0.05 | $Dy_2O_3$ 7 | 0.95 | 0.03 | 35 | 13 |
| 10* | 27 | 35 | 30 | $Dy_2O_3$ 7 | 1 | 0.60 | 8 | 10 |

Note: 9* and 10* are Comparative Examples 9 and 10.

Examples 51 to 66 and Comparative Examples 11 to 16

Each powder mixture having a composition shown in Tables 5 to 8 was mixed in a ball mill using ethanol as the disperse medium. The obtained mixture was granulated by a spray drier, followed by compacting and sintering. The sintering was carried out in a graphite pot, the inner surface of which being coated with boron nitride powder, at a temperature of 2000° C. and a pressure of 200 kg/cm$^2$ for one hour in a nitrogen atmosphere of 1 atm.

The resultant sintered products were evaluated on the the thermal shock resistance is not provided when the content of magnesium oxide is 30 wt. %. In addition, a beneficial adhesion resistance can be attained by the addition of any of magnesium oxide and $MgAl_2O_4$.

Any of the sintered products listed in Table 8 occurred no cracks and no fractures after the immersion in a molten iron, however, the bending strength was low when the aluminum oxide content was 30 wt. % and a good thermal shock resistance, adhesion resistance and melting loss resistance were obtained when the content was 15 wt. % or less.

TABLE 5

| Example No. | Composition (wt. %) | | | | | Thermal Shock Resistance | Melting Loss (vol. %) | Adhesion Amount (mg/cm$^2$) |
| --- | --- | --- | --- | --- | --- | --- | --- | --- |
| | AlN | BN | MgO | REO* | $Al_2O_3$ | | | |
| 51 | 40 | 45 | 15 | — | 0 | good | 0 | 4 |
| 52 | 60 | 30 | 10 | — | 0 | good | 0 | 3 |
| 53 | 75 | 20 | 5 | — | 0 | good | 0 | 2 |
| 11* | 0 | 65 | 35 | — | 0 | good | 11 | 29 |
| 12* | 90 | 5 | 5 | — | 0 | poor | — | — |

Note:

TABLE 5-continued

| Example | Composition (wt. %) | | | | | Thermal Shock | Melting Loss | Adhesion Amount |
|---|---|---|---|---|---|---|---|---|
| No. | AlN | BN | MgO | REO* | Al$_2$O$_3$ | Resistance | (vol. %) | (mg/cm$^2$) |

REO* is rare earth oxide.
11* and 12* is Comparative Examples 11 and 12.

TABLE 6

| Example | Composition (wt. %) | | | | | Thermal Shock | Melting Loss | Adhesion Amount |
|---|---|---|---|---|---|---|---|---|
| No. | AlN | BN | MgO | REO* | Al$_2$O$_3$ | Resistance | (vol. %) | (mg/cm$^2$) |
| 54 | 65 | 15 | 20 | — | 0 | 0 | good | 0 | 1 |
| 55 | 55 | 35 | 10 | — | 0 | 0 | good | 0 | 3 |
| 56 | 45 | 50 | 5 | — | 0 | 0 | good | 0 | 4 |
| 57 | 35 | 60 | 5 | — | 0 | 0 | good | 0 | 7 |
| 13* | 85 | 5 | 10 | — | 0 | 0 | poor | — | — |
| 14* | 30 | 68 | 2 | — | 0 | 0 | good | 15 | 14 |

Note:
REO* is rare earth oxide.
13* and 14* are Comparative Examples 13 and 14.

TABLE 7

| Example | Composition (wt. %) | | | | | Thermal Shock | Melting Loss | Adhesion Amount |
|---|---|---|---|---|---|---|---|---|
| No. | AlN | BN | MgO | REO* | Al$_2$O$_3$ | Resistance | (vol. %) | (mg/cm$^2$) |
| 58 | 64.8 | 35 | 0.2 | 0 | 0 | good | 1 | 2 |
| 59 | 59 | 40 | 1 | 0 | 0 | good | 0 | 2 |
| 60 | 40 | 50 | 10 | 0 | 0 | good | 0 | 3 |
| 61 | 35 | 45 | 20 | 0 | 0 | good | 0 | 5 |
| 62 | 60 | 35 | 15*[1] | 0 | 0 | good | 0 | 2 |
| 63 | 80 | 20 | 10*[1] | 0 | 0 | good | 0 | 3 |
| 15* | 60 | 40 | 0 | 0 | 0 | good | 9 | 53 |
| 16* | 40 | 30 | 30 | 0 | 0 | poor | — | — |

Note:
REO* is rare earth oxide.
15* and 16* are Comparative Examples 15 and 16.
*[1] means that MgO.Al$_2$O$_3$(MgAl$_2$O$_4$) was used instead of MgO

TABLE 8

| Example | Composition (wt. %) | | | | | Thermal Shock | Melting Loss | Adhesion Amount |
|---|---|---|---|---|---|---|---|---|
| No. | AlN | BN | MgO | REO* | Al$_2$O$_3$ | Resistance | (vol. %) | (mg/cm$^2$) |
| 64 | 57 | 30 | 10 | 0 | 3 | 30 | 0 | 2 |
| 65 | 52 | 35 | 5 | 0 | 8 | 25 | 0 | 2 |
| 66 | 60 | 23 | 2 | 0 | 15 | 20 | 0 | 1 |

Note: REO* is rare earth oxide.

Examples 67 to 80

Each powder mixture having a composition shown in Table 9 was mixed in a ball mill using ethanol as the disperse medium. The mean particle sizes of the starting materials used were the same as in Example 43. The obtained mixture was granulated by a spray drier, then followed by compacting at 1 ton/cm$^2$ by a uniaxial press and sintering. The sintering was carried out at 1800° C. for 3 hours in a nitrogen atmosphere without the application of pressure.

The resultant sintered products were evaluated on the thermal shock resistance, the melting loss resistance and the adhesion resistance to a molten iron in the same manner as in Example 43. The results are shown in Table 9.

From Table 9, it will be seen that a sintered ceramic composite excellent in the thermal shock resistance and adhesion resistance can be obtained by a pressureless sintering process (a sintering process with no application of pressure).

sintering. The sintering was carried out at 1800° C. for 3 hours in a nitrogen atmosphere without the application of pressure.

TABLE 9

| Example No. | Composition (wt. %) | | | | | Thermal Shock Resistance | Melting Loss (vol. %) | Adhesion Amount (mg/cm²) |
|---|---|---|---|---|---|---|---|---|
| | AlN | BN | MgO | REO* | Al₂O₃ | | | |
| 67 | 60 | 30 | 10 | — | 0 | 0 | good | 0 | 2 |
| 68 | 65 | 15 | 20 | — | 0 | 0 | good | 0 | 1 |
| 69 | 55 | 35 | 10 | — | 0 | 0 | good | 0 | 2 |
| 70 | 40 | 50 | 10 | — | 0 | 0 | good | 0 | 3 |
| 71 | 57 | 30 | 10 | — | 0 | 3 | good | 0 | 3 |
| 72 | 52 | 35 | 5 | — | 0 | 8 | good | 0 | 3 |
| 73 | 60 | 23 | 2 | — | 0 | 15 | good | 0 | 2 |
| 74 | 60 | 30 | 5 | Dy₂O₃ 5 | 0 | good | 0 | 3 |
| 75 | 53 | 35 | 2 | Dy₂O₃ 10 | 0 | good | 0 | 3 |
| 76 | 50 | 30 | 10 | Dy₂O₃ 5 | 5 | good | 0 | 3 |
| 77 | 45 | 35 | 5 | Dy₂O₃ 5 | 10 | good | 0 | 3 |
| 78 | 53 | 30 | 2 | Dy₂O₃ 10 | 5 | good | 0 | 3 |
| 79 | 60 | 30 | 5 | Y₂O₃ 5 | 0 | good | 0 | 5 |
| 80 | 50 | 35 | 5 | Y₂O₃ 5 | 5 | good | 0 | 4 |

Note: REO* is rare earth oxide.

Example 81 and Comparative Example 17 to 19

Each powder mixture having a composition shown in Table 10 was mixed in a ball mill using ethanol as the disperse medium. The mean particle sizes of the starting materials used were the same as in Example 43. The obtained mixture was granulated by a spray drier, then followed by compacting at 1 ton/cm² by a uniaxial press and sintering. The sintering was carried out at 1800° C. for 3 hours in a nitrogen atmosphere without the application of pressure.

The resultant sintered products were evaluated on the thermal shock resistance, the melting loss resistance and the adhesion resistance to a molten metal in the same manner as in Example 43. The results are shown in Table 10.

From Table 10, it will be seen that a good adhesion resistance may not be obtained by using an oxide of the alkaline earth metal other than magnesium.

The resultant sintered products were evaluated on the thermal shock resistance, the melting loss resistance and the adhesion resistance to a molten metal in the same manner as in Example 43. The results are shown in Table 11.

From Table 11, it will be seen that the adhesion resistance is obtained by the use of the rare earth oxide including yttrium oxide, and more beneficial effect is obtained by the use of dysprosium oxide.

TABLE 2

| Example No. | Composition (wt. %) | | | | | Thermal Shock Resistance | Melting Loss (vol. %) | Adhesion Amount (mg/cm²) |
|---|---|---|---|---|---|---|---|---|
| | AlN | BN | Oxide | Dy₂O₃ | Al₂O₃ | | | |
| 81 | 59 | 31 | MgO 2.5 | 7.5 | 0 | good | 0 | 1 |
| 17* | 59 | 31 | CaO 2.5 | 7.5 | 0 | good | 7 | 22 |
| 18* | 59 | 31 | BaO 2.5 | 7.5 | 0 | good | 9 | 23 |
| 19* | 59 | 31 | SrO 2.5 | 7.5 | 0 | good | 9 | 26 |

Note: 17* to 19* are Comparative Examples 17 to 19.

Examples 82 to 85

Each powder mixture having a composition shown in Table 11 was mixed in a ball mill using ethanol as the disperse medium. The mean particle sizes of the starting materials used were the same as in Example 43. The obtained mixture was granulated by a spray drier, then followed by compacting at 1 ton/cm² by a uniaxial press and

TABLE 11

| Example No. | Composition (wt. %) | | | | | Thermal Shock Resistance | Melting Loss (vol. %) | Adhesion Amount (mg/cm$^2$) |
|---|---|---|---|---|---|---|---|---|
| | AlN | BN | MgO | REO* | Al$_2$O$_3$ | | | |
| 82 | 59 | 31 | 2.5 | Dy$_2$O$_3$ 7.5 | 0 | good | 0 | 1 |
| 83 | 59 | 31 | 2.5 | Y$_2$O$_3$ 7.5 | 0 | good | 0 | 6 |
| 84 | 59 | 31 | 2.5 | CeO$_2$ 7.5 | 0 | good | 0 | 9 |
| 85 | 59 | 31 | 2.5 | Nd$_2$O$_3$ 7.5 | 0 | good | 0 | 9 |

Note: REO* is rare earth oxide..

Example 86

Figure 8:
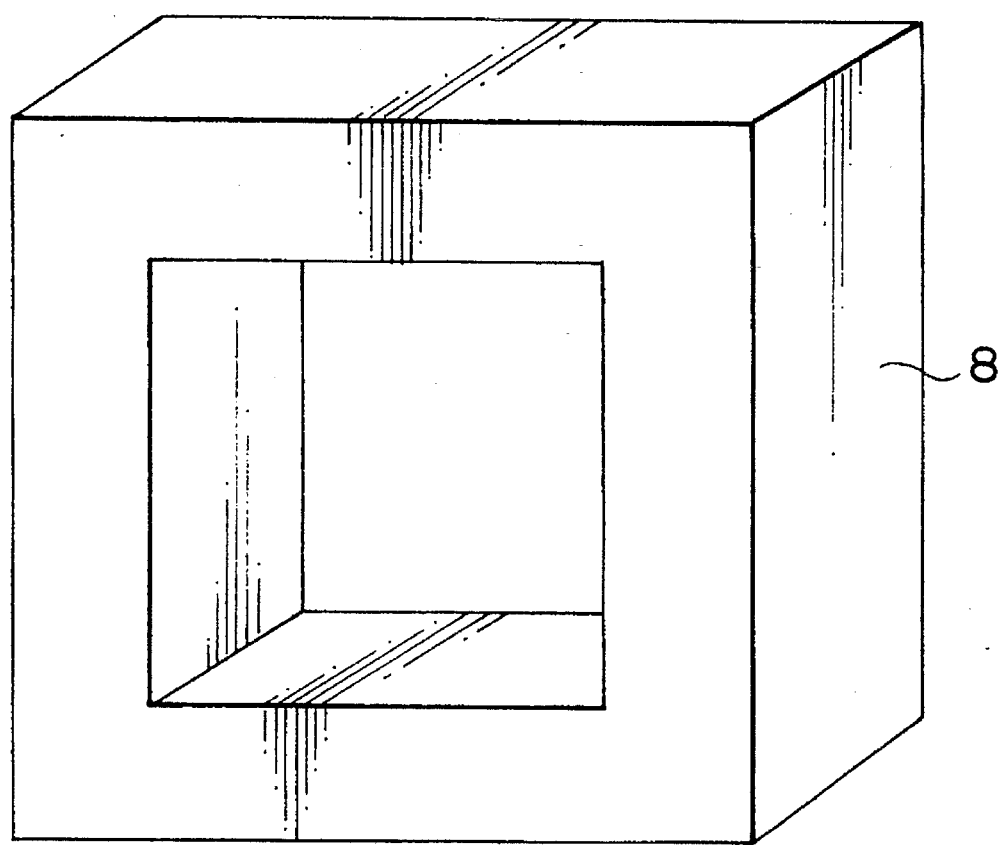
FIG. 8 is an external view of a break ring made of the sintered ceramic composite of the present invention.

A break ring shown in FIG. 8 having the external dimension of 120×120×20 mm and the internal dimension of 100×100×20 mm was produced from the sintered ceramic composite according to the present invention.

The sintered ceramic composite was obtained by forming a powder mixture consisting of 31 wt. % of boron nitride (particle size: 0.5 to 10 μm), 3 wt. % of magnesium oxide (particle size: 0.2 to 5 μm), 7 wt. % of dysprosium oxide (particle size: 0.2 to 5 μm) and 59 wt. % of aluminum oxide (particle size: 0.2 to 5 μm), then mixing the powder mixture in a ball mill using ethanol as the disperse medium followed by granulation by a spray drier, then compacting the resultant granules by hydrostatic pressing at 1 ton/cm$^2$, and then sintering preform at 1800° C. for 3 hours in a nitrogen atmosphere without the application of pressure.

Figure 9:
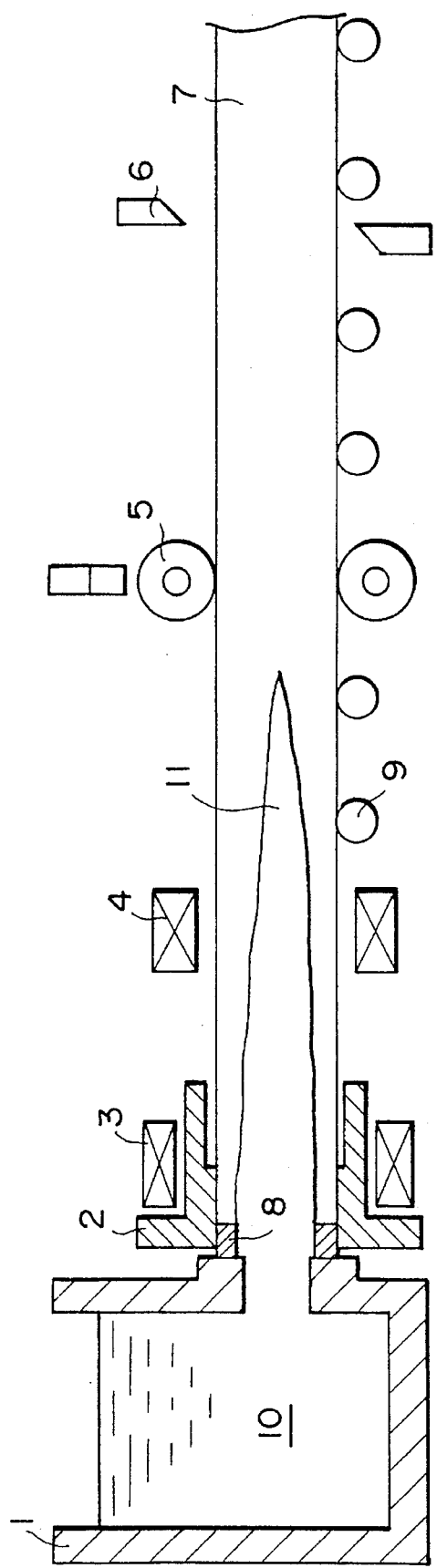
FIG. 9 is a horizontal cross-sectional view showing a general horizontal continuos castor.

The obtained break ring was applied to a horizontal continuous castor shown in FIG. 9 and the continuous casting of SKH51 steel was repeated with 90-minute running time. Of the numerical references of FIG. 9, 1 is a tundish, 2 is a Cu mold, 3 is an eloctromagnetic stirrer, 4 is another electromagnetic stirrer, 5 is a pinch roller, 6 is a cutter, 7 is a solidified cast piece, 8 is a break ring, 9 is a roller, 10 is a molten steel, and 11 is a cast piece in liquid state. The break ring was free from the adhesion of iron and the cast piece produced was good in its quality.

What is claimed is:

1. A sintered ceramic composite consisting essentially of 35 to 80 wt. % of aluminum nitride, 2 to 60 wt. % of boron nitride and 0.1 to 25 wt. % of an oxide of magnesium.

2. The sintered ceramic composite according to claim 1, wherein said sintered ceramic composite consists essentially of 35 to 80 wt. % of aluminum nitride, 10 to 60 wt. % of boron nitride and 0.1 to 25 wt. % of an oxide of magnesium.

3. A sintered ceramic composite consisting essentially of 35 to 80 wt. % of aluminum nitride, 2 to 60 wt. % of boron nitride, 0.1 to 25 wt. % of an oxide of magnesium, and 0.5 to 20 wt. % of at least one rare earth oxide including yttrium oxide.

4. The sintered ceramic composite according to claim 3, wherein said rare earth oxide is dysprosium oxide.

5. The sintered ceramic composite according to claim 3, wherein said sintered ceramic composite consists essentially of 35 to 80 wt. % of aluminum nitride, 2 to 45 wt. % of boron nitride, 0.5 to 25 wt. % of magnesium.oxide and 0.5 to 20 wt. % of at least one rare earth oxide including yttrium oxide.

6. The sintered ceramic composite according to claim 5, wherein said at least one rare earth oxide is dysprosium oxide.

7. The sintered ceramic composite according to claim 5 or 6, wherein the bending strength of said sintered ceramic composite is 15 MPa or higher after a thermal shock of a temperature difference of 1000° C.

8. A sintered ceramic composite consisting essentially of 35 to 80 wt. % of aluminum nitride, 2 to 60 wt. % of boron nitride, 0.1 to 25 wt. % of an oxide of magnesium, and 25 wt. % or less of aluminum oxide.

9. A molten metal contact member for use in contact with a molten iron-based alloy, said molten metal member being produced from a sintered ceramic composite consisting essentially of 35 to 80 wt. % of aluminum nitride, 2 to 60 wt. % of boron nitride and 0.1 to 25 wt. % of an oxide of magnesium.

10. A sintered ceramic composite consisting of 35 to 80 wt % of aluminum nitride, 2 to 60 wt % of boron nitride and 0.1 to 25 wt. % of an oxide of magnesium.

11. A sintered ceramic composite consisting of 35 to 80 wt. % of aluminum nitride, 2 to 60 wt. % of boron nitride, 0.1 to 25 wt. % of an oxide of magnesium and 0.5 to 20 wt. % of at least one rare earth oxide including yttrium oxide.

* * * * *